Nov. 29, 1966 — T. B. KEESLING — 3,288,391
REEL FOR PERFORATED TAPE
Filed Jan. 18 1965 — 2 Sheets-Sheet 1
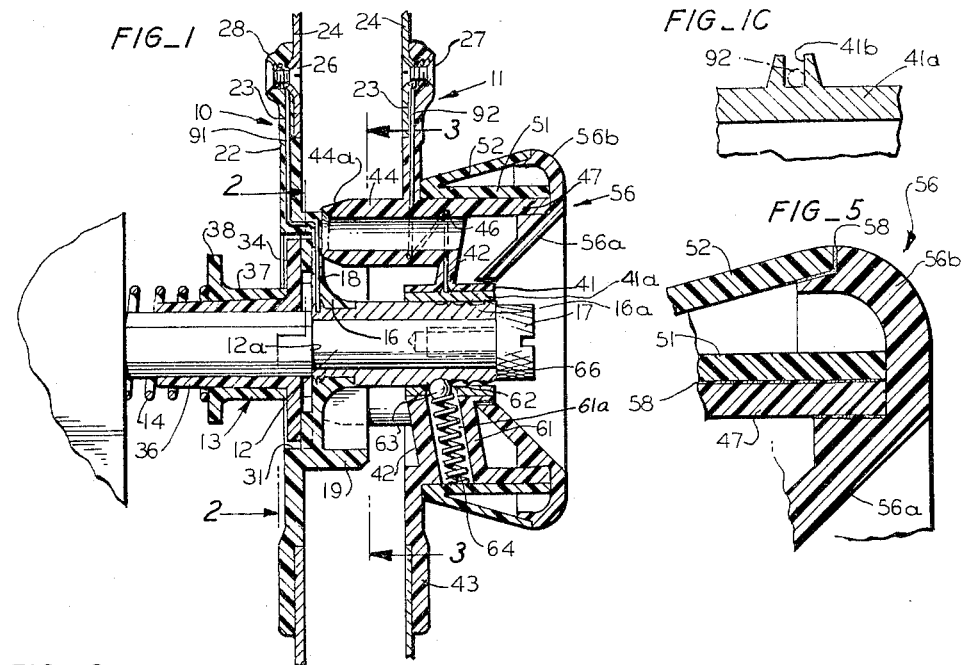
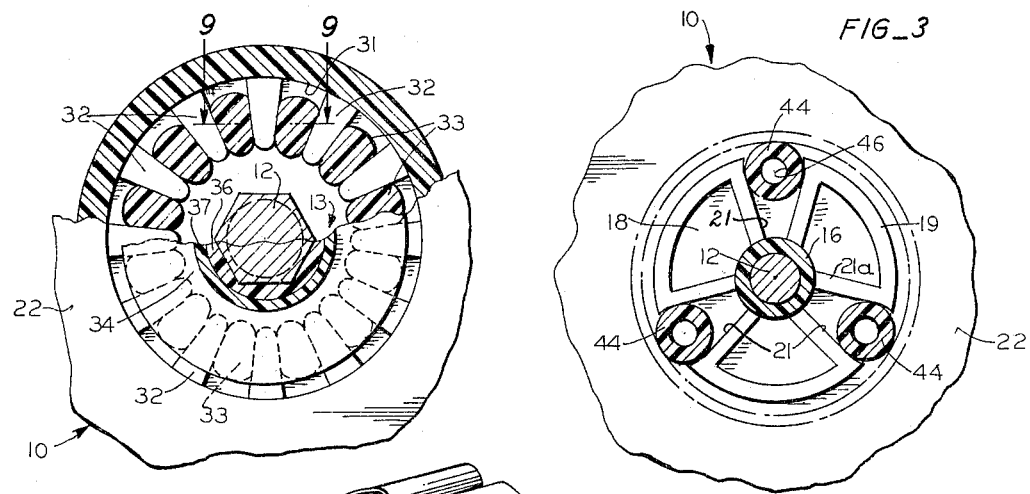
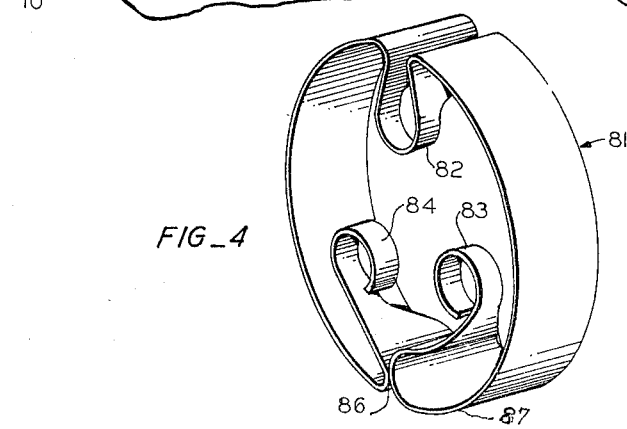
INVENTOR.
THOMAS B. KEESLING
BY
ATTORNEYS

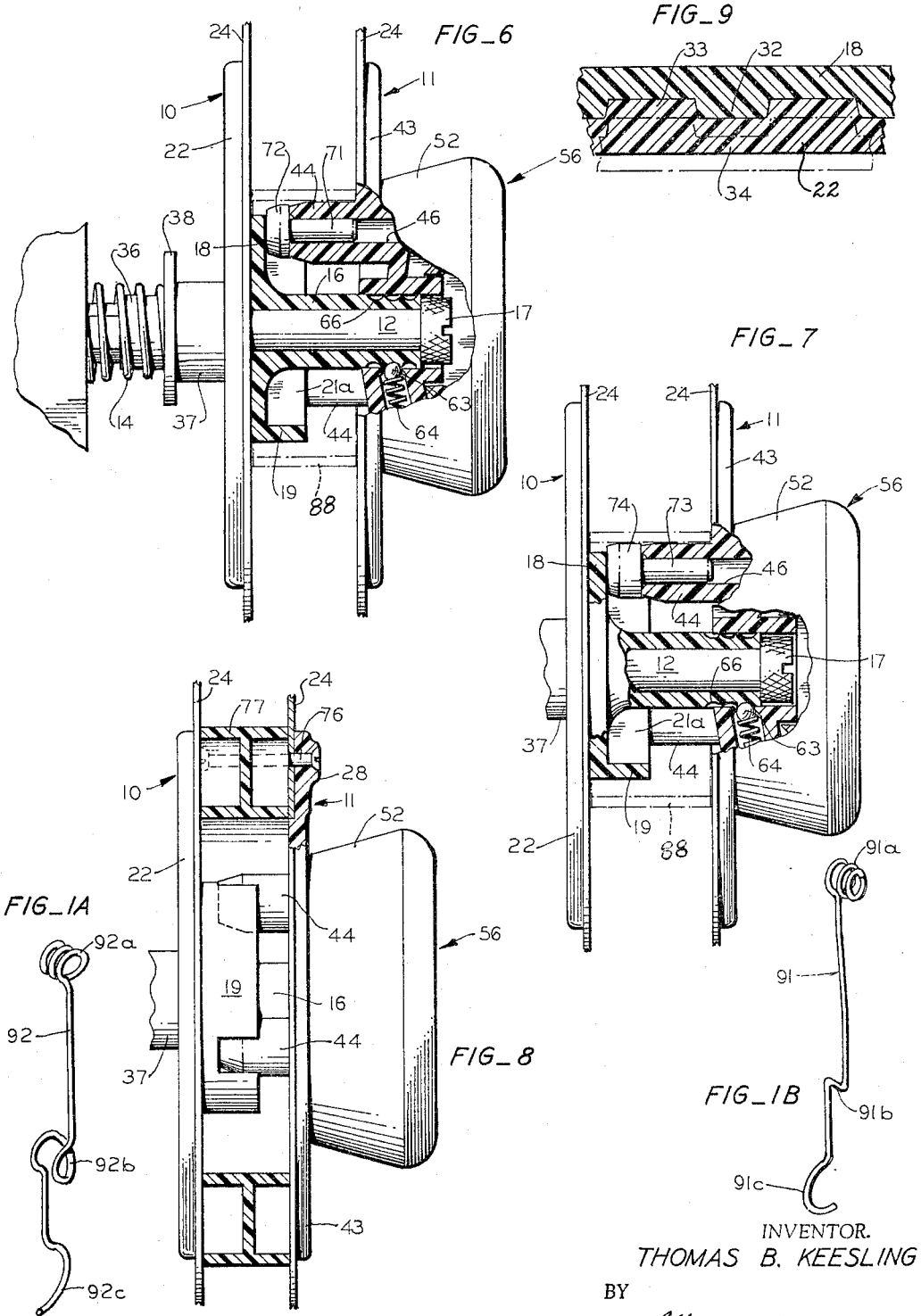

United States Patent Office 3,288,391
Patented Nov. 29, 1966

1

3,288,391
REEL FOR PERFORATED TAPE
Thomas B. Keesling, Los Gatos, Calif., assignor to Cycle Equipment Company, Los Gatos, Calif., a corporation of Nevada
Filed Jan. 18, 1965, Ser. No. 426,222
15 Claims. (Cl. 242—71.8)

The present invention relates to reels for perforated tape, for example, of the type used in the communication, data processing and computer industries and is concerned more particularly with the provision of an inexpensive light, versatile reel construction which will facilitate the use of the reel in any desired manner by the user. The reel is adapted for use upon both tape winders and tape feeders and other tape-handling mechanisms and is adaptable to handle a plurality of widths of tape.

The reel is molded principally of a plastic and is of a split type having an inner reel half which usually remains on the machine, and an outer reel half which is adapted to be disengaged from the inner reel half when desired and to carry the roll of tape therewith. Preferably, the plastic hub construction of the respective halves is formed with an annular seat at its outer periphery to which flange extensions of annular shape can be attached to provide any diameter reel that may be required.

It is a general object of the invention to provide a tape reel of improved, simplified and versatile construction.

A further object of the invention is to provide a reel construction in which standard reel hubs are used on both the inner and the outer halves for connection to respective flange extensions to give the particular reel diameter required.

Another object of the invention is to provide a reel which is adjustable to fit different widths of tape.

It is a further object of the invention to provide a reel construction which can be used to hold the standard 2" cardboard core on which tape is supplied, which can be used also to wind tape on such a core and can also be supplied with larger diameter cores such as the standard 3" diameter, and the 4½" diameter as used with the standard reel of the National Association of Broadcasters (NAB reel).

A further object of the invention is to provide a molded reel construction of a suitable type having clutch teeth for driving the reel formed integrally therewith.

It is still another object of the invention to provide a reel having clutch teeth as described above and cooperating therewith a plastic sleeve having respective annular ribs, one of which is provided with clutch teeth to mate exactly with the clutch teeth on the adjacent reel.

It is still a further object of the invention to provide a plastic split reel assembly having a ball retainer, which ball retainer is preassembled at the factory and is wholly concealed within the reel construction.

Further objects and advantages of the invention will be apparent from the following description of a preferred embodiment of the reel structure taken in conjunction with the accompanying drawings, in which:

FIG. 1 is a vertical sectional view through the hubs of a reel with the flange extensions thereon shown in fragmentary fashion;

FIG. 1A is a perspective view of a wire insert member for the reel structure;

FIG. 1B is a perspective view of a second wire insert member;

FIG. 1C is a fragmentary enlarged view typical of the sleeve inserts in the reel hubs of the two reel halves;

FIG. 2 is a sectional elevational view taken in a plane indicated by the line 2—2 in FIG. 1;

2

FIG. 3 is a vertical sectional elevation taken in a plane indicated by the line 3—3 in FIG. 1;

FIG. 4 is a perspective view of one form of tape clip that can be employed with the present reel;

FIG. 5 is an enlarged fragmentary view illustrating the method of bonding the various plastic parts together;

FIG. 6 is a view generally similar to FIG. 1 but with certain parts shown in elevation in illustrating a second spacing-apart of the flanges of the reel;

FIG. 7 is a view similar to FIG. 6 illustrating a third spacing-apart of the reel flanges;

FIG. 8 is a fragmentary sectional view partially in elevation in showing the use of a standard NAB reel hub or core as mounted in this reel;

FIG. 9 is an enlarged fragmentary sectional view taken on line 9—9 in FIG. 2 and illustrating the engagement or meshing of the clutch construction for driving the reel.

One winder with which the present reel may be employed and one showing an identical mounting of the reel is disclosed in the patent to Keesling 3,045,941, dated July 24, 1962, to which reference is made for details of the mounting and cooperating parts of the winder in connection with the reel which are not disclosed herein.

Referring to FIG. 1, the split-type reel includes an inner reel half 10 and an outer reel half 11 which are carried by drive shaft 12 of the type shown in the above patent and which have associated therewith a clutch 13 urged to clutching position by a spring 14, as later described. The inner reel half is of molded plastic and is provided with a tubular hub 16, which is formed in part of a metal insert 16a which is molded into the hub 16 and has an inner bore to journal on the round extension of the shaft 12 and adapted to be held thereon in a conventional way be a retaining screw 17 having threaded engagement with the shaft 12. The inner end of the tubular hub 16 is held in position at the left portion thereof by the shoulder 12a formed between the hexagon part of the shaft and the round part of the shaft 12. The fit of the tubular extension or insert 16a between the screw 17 and the shoulder 12a is free for turning of the tubular hub and the reel on the shaft.

At its left hand or its inner end, the tubular hub 16 (FIG. 1) merges with a plastic annular flange 18 which, at its outer edge, has cylindrical wall segments 19 formed thereon. The wall 19 as seen in FIG. 3 is made segmental in order to provide clutching grooves 21 which are defined by integral radial walls 21a extending inwardly from the ends of the wall segments 19 to the tubular hub 16. The flange 18, the wall 19 and the radial walls 21a in effect form an enlarged cylindrical portion provided with clutch grooves. Extending outwardly in offset relation from the annular flange 18 is a plastic annular flange extension 22, which has an annular or circular seat 23 adjacent its outer edge to receive a metallic annular flange extension 24 which seats therein and is secured in place by a plurality of screws 26 engaging tubular nuts 27 in each of a plurality of bosses 28 formed in the flange extension 22. Extending between the fastening screw 26 and the tubular hub 16a is a formed wire 91 (FIGS. 1 and 1B) having a coil portion 91a which contacts the nut 27 through screw 26 and thereby is in conducting relation wiht the flange 24, which has at its center portion an offset portion 91b to follow the contour of the plastic reel hub, and which at its lower end has an arcuate portion 91c which may be pressed into a pair of spaced-apart annular ribs of the hub 16a so as to complete the electrical ground circuit from the metal flange 24 to the machine.

Flange extension 22 (FIGS. 1, 2 and 9) encompasses a circular recess 31 in the inner reel half, in which are formed a series of integral radially extending wedge-shaped teeth 32 for engagement with corresponding wedge-shaped teeth 33 on a flange 34 of the clutch assembly. The flange 34 of the clutch assembly merges integrally with a tubular hub 36 thereof and seated over this and bonded thereto is a second hub 37 including at its inner end a flange 38 for engagement by a clutch control part (not shown) and by the spring 14 which seats over the extending portion of the hub 36.

The outer reel half 11 comprises a second tubular hub 41 which includes a metal tubular insert 41a (FIGS. 1 and 1C) and which slides freely over the first tubular hub 16 of the inner reel half and has a radially extending plastic wall or flange 42 which terminates in offset annular plastic flange extension 43, generally similar to the flange extension 22 and having its seat 23 facing the seat 23 of the flange 22.

In order to provide an electrical ground from the metal outer flange 24 of the outer reel half the tubular insert 41a is provided with a pair of spaced-apart annular ribs 41b (FIGS. 1 and 1C), similar in all details to the annular ribs on the sleeve insert 16a. Associated with the insert 41a is a wire insert 92 (FIGS. 1 and 1A). This insert has a semi-circular portion 92c which has a press fit within the annular ribs 41b. The insert 92 is also provided with an intermediate coil portion 92b which is embedded in one of the hollow projections 44 and at its extremity has a coil portion 92a which is embedded in plastic around fastening screw 27 and makes contact therewith.

Integrally formed with the wall 42 (FIGS. 1 and 3) are three tubular clutch projections 44 providing male clutch members to engage in the slots of female clutch members 21 of the inner reel half. These projections 44, as previously described, are hollow to provide seats 46 therein for a purpose later described. The cylindrical wall 47 of the outer reel half is integral with the outer flange extension 43 and provides a seat for a handle member comprising an inner cylindrical wall 51 and an outer conical wall 52 which meet integrally to seat against the adjacent flange extension 43 being chemically bonded thereto. To mate with the respective walls 51 and 52, a cover member 56 is provided with a conical inner wall portion 56a, which is disposed about the hub 41 and a curved annular outer wall portion 56b which at its outer edge turns inwardly to overlap and seat against the outer end of a wall 51 and the conical wall 52 to which it is chemically bonded, as indicated at 58 in FIG. 5.

Attached to the wall means 42 (FIG. 1) is a hole-forming cylindrical wall 61 which extends substantially radially with respect to the flange and terminates in an apertured seat 62 which is engaged by a retaining ball 63 urged by a spring 64 which is held captive in the radial hole 61a within the wall 61 by the wall 51. Cooperating with the spring-pressed ball 63 are a series of annular grooves 66 so that the outer reel half is releasably held in place on the inner reel half. Referring to FIG. 3, it will be seen that upon engaging the outer reel half with the inner reel half, the male clutch parts or projections 44 will either engage in the recesses 21 or with the annular segmental walls 19 so that a slight turning may be required until the tapered end 44a of each projection mates with and engages a female clutch seat. Then the reel half is pushed inwardly until the end of the projections engage the annular flange 18 when the ball 63 will be seated in the innermost groove 66 so that the reel flanges 24 are spaced apart to match the narrowest width of tape to be used, which is usually 11/16 of an inch.

Referring to FIGS. 6, 7, etc., the two hubs for the two reel halves are formed entirely of plastic and the metal inserts are not used, and the flange extensions in this case are also of plastic material. As seen in FIG. 6, button extensions 71 may be seated in the holes 46 within each clutch projection 44 so that the alteral dimension of its head 72 with respect to the reel will determine an increased spacing of the reel, and it will be noted that the ball 63 is seated in the middle one of the grooves 66, this spacing-apart of the reel halves corresponding to a 7/8" wide tape. Correspondingly, respective inserts 73 (FIG. 7) may be employed which have a thicker head 74 to increase the spacing-apart of the flange and the reel halves to correspond to substantially a 1" wide tape.

As shown in FIG. 8, a special attachment or reel core or hub 77 may be secured to the outer reel half by long fastening screws 76, and this annular member, which is usually formed of aluminum or the like, may comprise a standard NAB core, which provides a 4½" outer diameter and is provided to match any of the tape widths.

FIG. 4 illustrates a cylindrical core member for use on the reel which is formed of resilient sheet metal 81 and has three inwardly extending loops 82, 83, and 84 of circular form for engagement over the three pins or clutch member 44 of the outer reel half 11. The circular fastening elements 84 and 83 are formed at the ends of the spring member 81 and the two adjacent end-portions are formed as loops 86 and 87 to engage each other under spring pressure. By placing a finger inside the loop 87, this loop can be flexed inwardly so that tape can be inserted between the loops 86 and 87 and will be subsequently grasped and retained when the finger pressure is released. The retainer loops 82, 83, and 84 are narrower in construction than the body portion 81 to fit into the space between the lower portion 19 of the inner reel half and the adjacent wall portion 43 of the outer flange 11 as seen in FIG. 1.

Referring to FIGS. 6 and 7, there is illustrated in dotted lines a cardboard core 88 of the type commonly employed to hold an unperforated roll of tape and the circular dimension of the outer portions of the clutch members 44 are such as to provide press fit within these cardboard cores. When a cardboard core is employed the end of the tape is fastened to it by a suitable adhesive method such as Scotch tape.

The wire inserts 91 and 92 forming part of the electrical ground for the reel flanges 24 have been previously described in connection with the cooperating parts of the reel.

While I have shown a preferred embodiment of the invention, it will be understood that the invention is capable of variation and modification from the form shown so that its scope should be limited only by the scope of the claims appended thereto.

I claim:

1. A split-type reel for holding tape comprising an inner reel half and an outer reel half; said inner reel half including a molded plastic part having a first tubular hub provided with a shaft-engaging inner bore and a series of annular grooves about its periphery, an enlarged cylindrical portion provided with radially extending open clutch grooves, a circular flange extending radially outward in offset relation to said enlarged cylindrical portion, and defining within its inner periphery a cylindrical recess, and an annular series of clutch teeth within said recess; said outer reel half comprising a molded plastic structure including a second tubular hub for sliding engagement over said first tubular hub, a circular flange, wall means connecting said second tubular hub and said flange, circumferentially spaced clutch projections extending from said wall means in parallel relation to said second hub and spaced correspondingly to said grooves of said inner reel half to seat therein to provide driving engagement between said reel halves and to space said reel halves apart, means on said wall means forming a radially extending hole, said hole extending through said second tubular hub and having a seat within said second tubular hub, and a spring-urged member positioned in said hole and engaging said seat to project therethrough for engagement with one of said annular grooves.

2. A split-type reel for holding tape comprising an inner reel half and an outer reel half; said inner reel half having a first tubular hub provided with a shaft-engaging inner bore and a series of annular grooves about its periphery, an enlarged cylindrical portion provided with radially extending open clutch grooves, a circular flange extending radially outwardly in offset relation to said enlarged cylindrical portion, and defining within its inner periphery a cylindrical recess, and an annular series of clutch teeth within said recess; said outer reel half including a second tubular hub for sliding engagement over said first tubular hub, a circular flange, wall means connecting said second tubular hub and said flange, circumferentially spaced clutch projections extending from said wall means in parallel relation to said second hub and spaced correspondingly to said grooves of said inner reel half to seat therein to provide driving engagement between said reel halves and to space said reel halves apart, means on said wall means forming a radially extending hole, said hole extending through said second tubular hub and having a seat within said second tubular hub, and a spring-urged member positioned in said hole and engaging said seat to project therethrough for engagement with one of said annular grooves.

3. A split-type reel for holding tape comprising an inner reel half and an outer reel half; said inner reel half including a molded plastic part having a first tubular hub provided with a shaft-engaging inner bore, an enlarged cylindrical portion provided with radially extending clutch grooves, a circular flange extending radially outwardly in offset relation to said enlarged cylindrical portion, and an annular series of clutch teeth about said bore at one end thereof; said outer reel half comprising a molded plastic structure including a second tubular hub for sliding engagement over said first tubular hub, a circular flange, wall means connecting said second tubular hub and said flange, circumferentially spaced clutch projections extending from said wall means in parallel relation to said second hub and spaced correspondingly to said grooves of said inner reel half to seat therein to provide driving engagement between said reel halves and to space said reel halves apart, and means for releasably connecting said reel halves.

4. A split-type reel as recited in claim 3 in which said circumferentially spaced projections are hollow and having respective pins seating therein to extend within said groove and determine the spacing-apart of said reel halves.

5. A split-type reel as recited in claim 3 in which said clutch teeth taper radially inwardly to their inner radial dimension, and a clutch member for engagement with said first hub and having a corresponding annular series of clutch teeth also tapering radially inwardly from the outer radial portion to their innermost radial portion, said clutch member also comprising a molded plastic assembly including a hub, and an annular flange carrying said series of clutch teeth, and a flange spaced from said annular flange, said two parts of said clutch being bonded together.

6. A split-type reel as recited in claim 3 in which said clutch teeth taper radially inwardly to their inner radial dimension, and a molded plastic clutch member for engagement with said first hub and having a corresponding annular series of clutch teeth also tapering radially inwardly from the outer radial portion to their innermost radial portion.

7. A split-type reel as recited in claim 3 in which said outer reel half includes a cylindrical wall extending outwardly from said flange and having a radial hole therein, said wall means and a tubular cylindrical part seating over said cylindrical wall to close said radial hole and being bonded thereto form a handle.

8. In a split-type reel as recited in claim 3 in which said circular flanges of both said inner reel half and said outer reel half have seats formed at the periphery thereof and including spaced-apart aperture enlargements, respective annular flange extensions seated in said seats, and fastening means for said flanges in said respective enlargements.

9. A split-type reel for holding tape comprising an inner reel half and an outer reel half; each of said reel halves including detachably engaged hubs, each hub being provided with a circular flange, a circular seat formed in each flange, said seats facing each other, and annular flange extensions having their inner peripheries engaged with said seats and secured to said respective flanges to form an extension of the diameter of said reel, said mounting of said flange extensions permitting the use of different diameter flange extensions to provide different diameter reels utilizing said respective hubs.

10. A split-type reel for holding tape comprising an inner reel half and an outer reel half; each of said reel halves including a hub, and said inner reel hub having a female clutch part and said hub of said outer reel having respective male clutch parts to seat in said female clutch parts, and a plurality of attachment means for one of said clutch parts to provide selective spacing-apart of said reel halves in accordance with the width of the tape.

11. A split-type reel as recited in claim 10 in which said male clutch parts are formed in a circular array and provide mounting for a tape-holding member, and a tape-holding member seated over said male clutch parts and having a diameter larger than the effective outer diameter of said female clutch parts.

12. A split-type reel as recited in claim 10, in which said male clutch parts are disposed in circular array, and a cylindrical tape holding member having driving engagement with said male clutch parts.

13. A split-type reel as recited in claim 10, in which said male clutch parts are disposed in a circular array, and a tape holding member formed in a generally cylindrical shape and having a plurality of inwardly disposed loops for engaging over said male clutch parts, two of the said loops being formed at the ends of the tape holding member, and said member having loop portions adjacent said ends and spring-urged together to engage and hold the tape.

14. A split-type reel as recited in claim 3 in which said inner reel half has a metallic outer flange mounted in said circular plastic flange, a metallic tubular insert in said tubular hub, and conducting means connecting said tubular insert to said outer flange, and said outer reel half having a metallic outer flange and a metallic insert in its second tubular hub, and conducting means connecting said second metallic insert to the associated metallic outer flange.

15. A split-type reel as recited in claim 14 in which said respective conducting means comprise formed wire parts having a connection to the associated metallic hub, and also having a connection to said outer metallic flanges.

References Cited by the Examiner
UNITED STATES PATENTS 3,042,180 7/1962 Bishop.
3,045,941 7/1962 Keesling _____ 242—71.8
3,143,313 8/1964 Puzycki _____ 242—71.8

FRANK J. COHEN, Primary Examiner.

MERVIN STEIN, Examiner.

N. L. MINTZ, Assistant Examiner.